(12) United States Patent
Montagna et al.

(10) Patent No.: US 7,025,398 B1
(45) Date of Patent: Apr. 11, 2006

(54) PULL OUT DRAWER SYSTEM

(75) Inventors: John C. Montagna, Metamora, MI (US); Donald J. LaBelle, Macomb Township, Macomb County, MI (US)

(73) Assignee: Durakon Acquisition Corp., Lapeer, MI (US)

(*) Notice: Subject to any disclaimer, the term of this patent is extended or adjusted under 35 U.S.C. 154(b) by 10 days.

(21) Appl. No.: 10/696,342

(22) Filed: Oct. 29, 2003

Related U.S. Application Data

(60) Provisional application No. 60/423,631, filed on Nov. 4, 2002.

(51) Int. Cl.
*B60P 3/34* (2006.01)
*B62C 1/06* (2006.01)
*B62D 33/08* (2006.01)

(52) U.S. Cl. ............................. 296/26.01; 296/26.09; 296/61; 414/522; 414/537

(58) Field of Classification Search ............. 296/26.09, 296/26.05, 26.01, 26.03, 26.13, 61; 414/537, 414/522
See application file for complete search history.

(56) References Cited

U.S. PATENT DOCUMENTS

| | | | | |
|---|---|---|---|---|
| 3,768,673 A | * | 10/1973 | Nydam et al. ............... | 414/522 |
| 4,061,246 A | | 12/1977 | Miksitz | |
| 4,601,160 A | | 7/1986 | Heisler | |
| 4,909,558 A | | 3/1990 | Roshinsky | |
| 5,458,350 A | * | 10/1995 | Johnson et al. .......... | 280/47.26 |
| 5,649,731 A | * | 7/1997 | Tognetti ................... | 296/26.09 |
| 5,803,523 A | * | 9/1998 | Clark et al. ................ | 296/26.1 |
| 5,934,725 A | | 8/1999 | Bowers | |
| 5,971,465 A | * | 10/1999 | Ives et al. ..................... | 296/61 |
| 6,007,142 A | * | 12/1999 | Gehman et al. ............ | 296/171 |
| 6,065,792 A | | 5/2000 | Sciullo et al. | |
| 6,116,671 A | * | 9/2000 | Schneider ................ | 296/26.01 |
| D446,181 S | | 8/2001 | Darbishire | |
| D452,472 S | | 12/2001 | Darbishire | |
| 6,328,364 B1 | | 12/2001 | Darbishire | |
| D458,209 S | | 6/2002 | Darbishire | |
| D478,858 S | | 8/2003 | LaBelle | |
| 2003/0072641 A1 | * | 4/2003 | Reed et al. ................. | 414/537 |

OTHER PUBLICATIONS

Montagna et al., U.S. Provisional Appl. No. 60/423,631 filed Nov. 4, 2002 A.D..

* cited by examiner

*Primary Examiner*—Dennis H. Pedder
(74) *Attorney, Agent, or Firm*—Christopher John Rudy

(57) ABSTRACT

A pull out system, or a pull out drawer system for vehicles and trailers can be improved by an inverted French F-channel as a stationary rail; an inverted U-channel as a movable rail; and/or a cam-follower bearing being present among rollers on the rails. Also, a movable frame for a pull out drawer system can be improved by providing a support member for supporting a slide-in/out accessory, for example, a drawer or a ramp, and further by providing the accessory with such a frame.

20 Claims, 9 Drawing Sheets

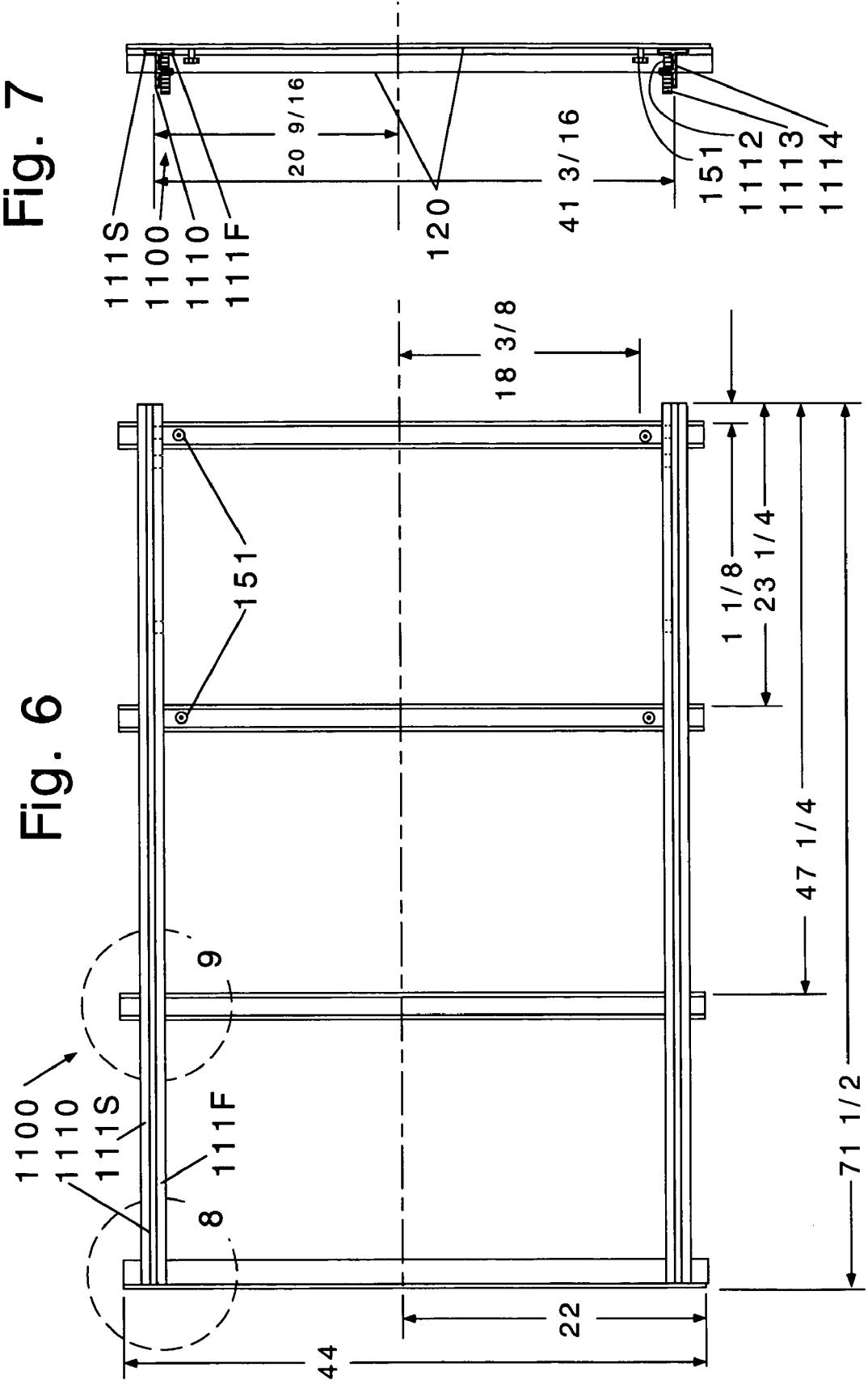

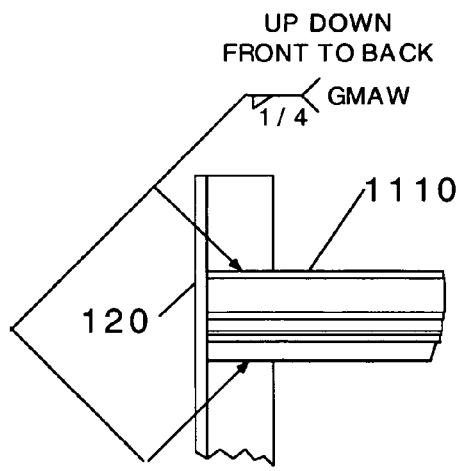
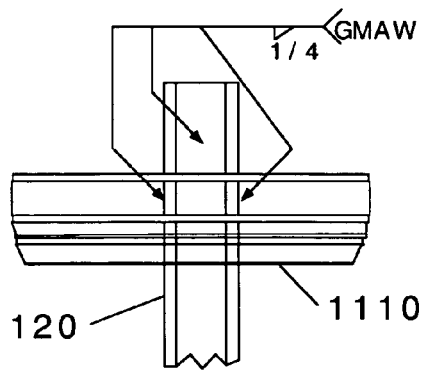
Fig. 8              Fig. 9
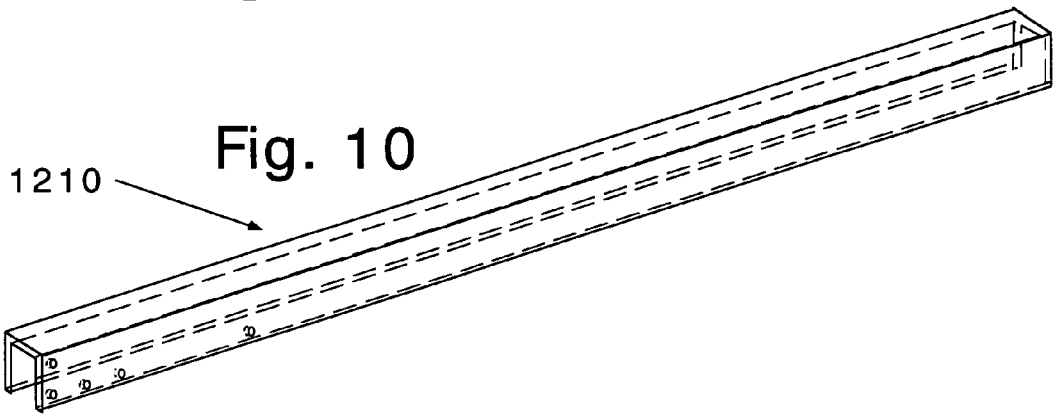
Fig. 10
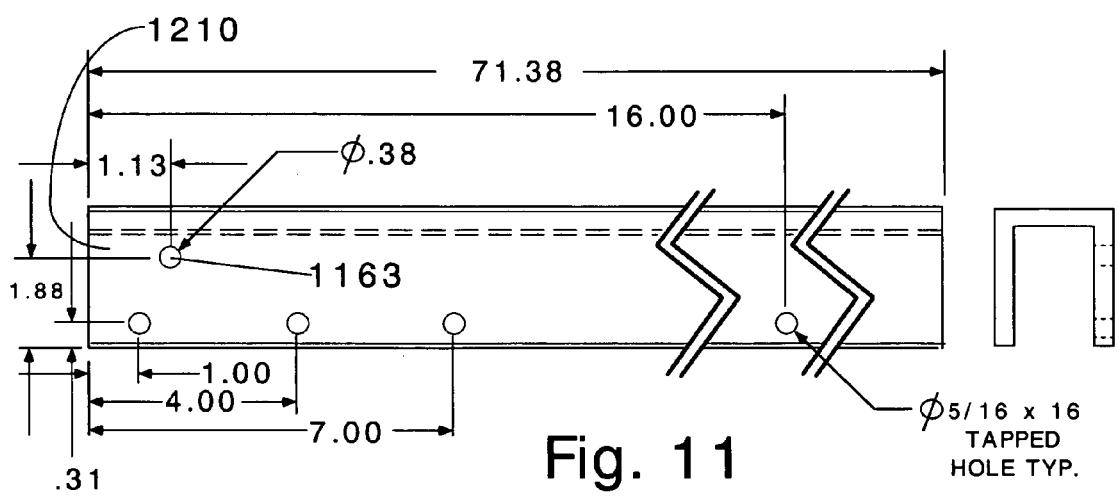
Fig. 11

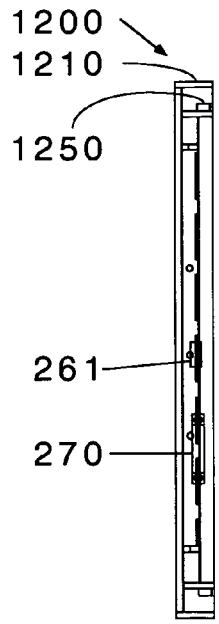
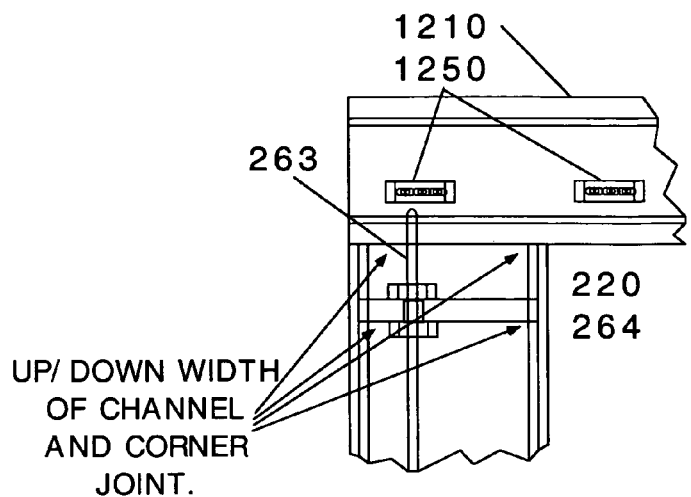
Fig. 15
Fig. 16
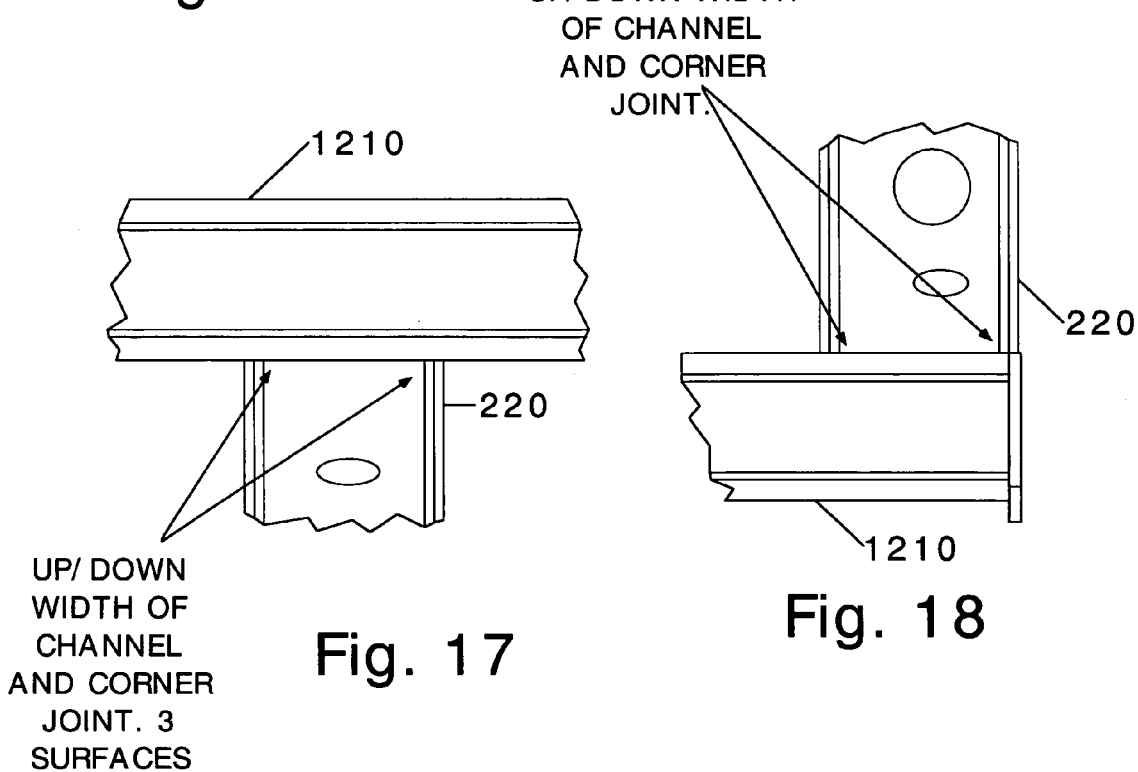
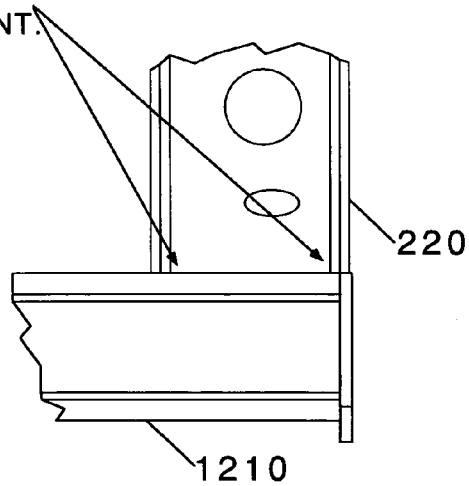
Fig. 17
Fig. 18

PULL OUT DRAWER SYSTEM

This claims benefits under 35 USC 119(e) of U.S. provisional patent application No. 60/423,631 filed on Nov. 4, 2002 A.D. The complete specification of that application is incorporated herein by reference.

FIELD OF THE INVENTION

The present invention concerns a pull out system as for vehicles and trailers, useful for carrying cargo and dunnage, components therefor, and vehicles or trailers modified therewith.

BACKGROUND TO THE INVENTION

Various devices for carrying of cargo and dunnage are known. See, e.g., U.S. Pat. Nos. 6,328,364 to Darbishire, 6,065,792 to Scioullo et al., 5,934,725 to Bowers, and 4,909,558 to Roshinsky.

One of the more successful of such devices is that disclosed within the Darbishire patent, in which, for instance, an inverted F-channel and an inverted J-channel are employed as side rails in conjunction with rollers so as to provide a pull out frame, and a polyethylene tray is mounted to the top, moving frame component. See also, Darbishire, U.S. Pat. Nos. D446,181; D452,472; and D458,209. However, even that pull out drawer system for vehicles and trailers is not without its drawbacks. For example, under extremely heavy use, or in uses where loading is not done evenly or a load is dropped onto the system, the system may wear out sooner than desired, or, with excessive abuse, break.

It would be desirable to ameliorate or overcome any drawbacks associated with such devices, particularly the Darbishire system.

DISCLOSURE OF THE INVENTION

The present invention provides in a pull out system, or in a pull out drawer system for vehicles and trailers, especially a system disclosed within the aforementioned patents to Darbishire, which, for instance, includes a stationary rail having a first set of rollers mounted thereon, said rail adapted for receiving a second set of rollers; and a movable rail having the second set of rollers mounted thereon, wherein the movable rail is mounted to the rail with rolling contact both between the first set of rollers and the movable rail and between the stationary rail and the second set of rollers—or which, as another instance for purposes of illustration, includes a stationary mounting frame having a set of parallel rails having a first set of rollers mounted thereon, said set of rails adapted for receiving a second set of rollers; and a subcombination having a movable mounting frame having the second set of rollers mounted thereon, and a load-bearing surface mounted to the movable frame, the movable frame and load-bearing surface subcombination mounted to the stationary mounting frame with rolling contact both between the first set of rollers and the movable frame and between the set of parallel rails and the second set of rollers—the improvement which comprises at least one of the following items:

as the stationary rail(s) an inverted French F-channel;
as the movable rail(s) an inverted U-channel; and
among the rollers, at least one being a cam-follower bearing. Provided as well is, in a movable frame for a pull out drawer system, a support member for supporting a slide-in/out accessory, itself with the movable frame, and in combination not only with other components of the pull out drawer system but independently also with the slide-in/out accessory.

The invention is useful in carrying cargo and dunnage.

Significantly, by the invention, drawbacks associated with devices or systems of the prior art are ameliorated or overcome. In particular, the Darbishire pull out system and pull out drawer system are improved in kind. Employed as a modification to the inverted F-channel of the Darbishire system, the present inverted French F-channel provides dramatically increased stabilization and accommodation of much heavier loads; as a modification to the inverted J-channel of the Darbishire system, the inverted U-channel can provide, among other things, increased strength and stability; and as a roller, which can replace the roller ball bearings known to have been employed in the Darbishire system, the one which has the cam-follower bearing can, especially in conjunction with an inverted F-channel or an inverted French F-channel made wider to accommodate a generally wider roller with cam-following bearing, and preferably also made to the stronger, provide for smooth operation under very heavy and sometimes sudden stresses. Also, the support member for supporting the slide-in/out accessory adds versatility in kind to the system. As examples, the slide-in/out accessory may be a ramp or drawer for transport or safekeeping of such cargo as tools and spare parts, long guns and fishing rods.

Numerous further advantages attend the invention.

The drawings form part of the specification hereof. With respect to the present drawings, which are not necessarily drawn to scale, the following is briefly noted:

FIG. 6 is a top plan view of a stationary mounting frame of the invention, which includes a paired set of parallel inverted French F-channels from FIG. 5.

FIG. 7 is a rear plan view in elevation of the stationary mounting frame of FIG. 6.

FIG. 8 is a top plan view in detail of part of the frame within the circle 8 of FIG. 6.

FIG. 9 is a top plan view in detail of part of the frame within the circle 9 of FIG. 6.

FIG. 10 is a perspective plan view of an inverted U-channel of and employed in the invention.

FIG. 11 is a side plan view in elevation of the inverted U-channel of FIG. 10.

FIG. 15 is a rear plan view in elevation of the movable mounting frame of FIG. 14.

FIG. 16 is a top plan view in detail of part of the frame within the circle 16 of FIG. 14.

FIG. 17 is a top plan view in detail of part of the frame within the circle 17 of FIG. 14.

FIG. 18 is a top plan view in detail of part of the frame within the circle 18 of FIG. 14.

Figure 1:
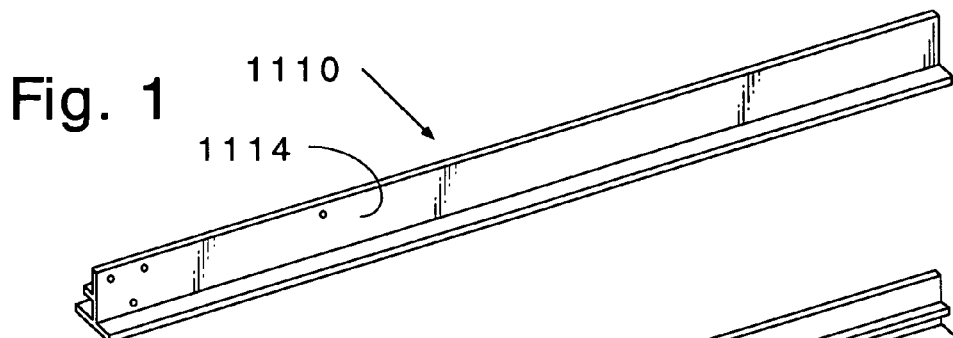
FIG. 1 is a perspective view from an outside position of an inverted French F-channel of and employed in the invention.
Figure 2:
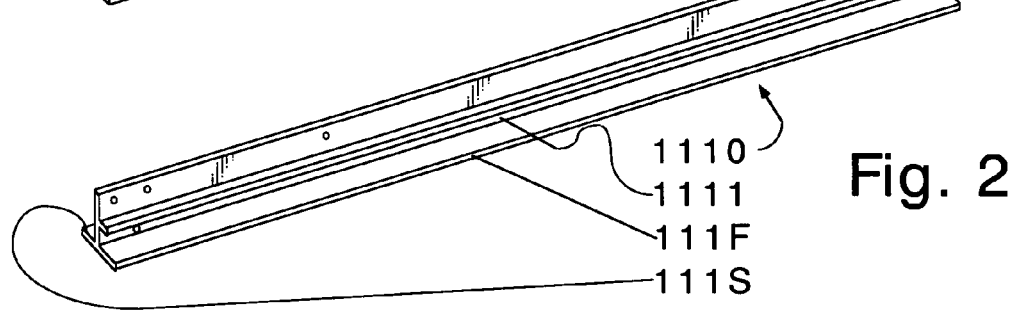
FIG. 2 is a perspective view from an inside position of the inverted French F-channel of FIG. 1.
Figure 3:
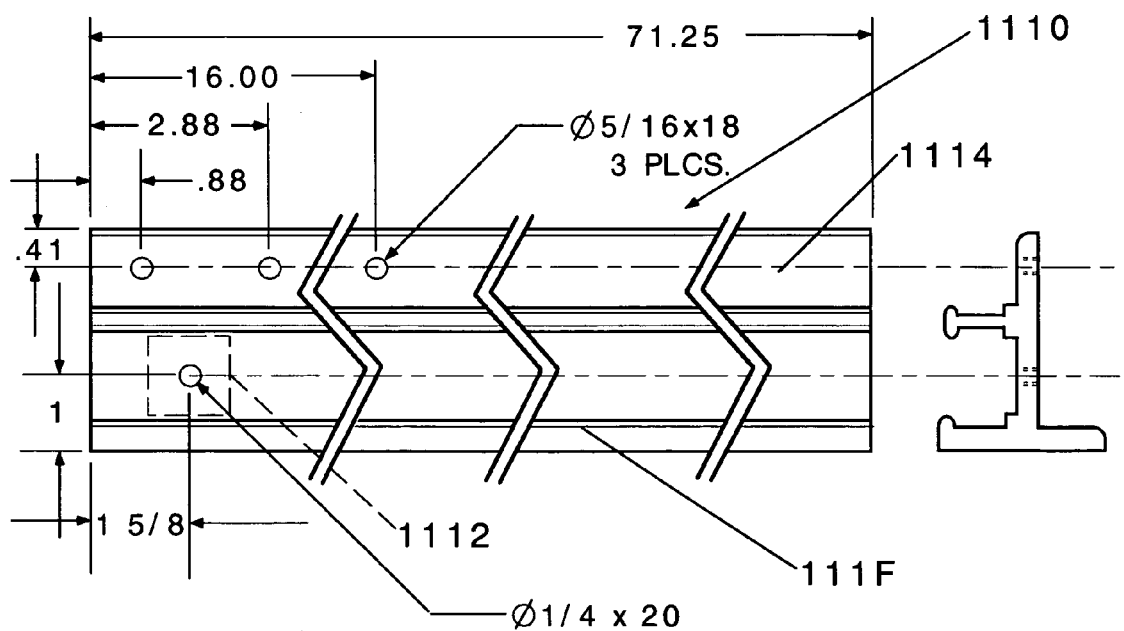
FIG. 3 is a view in elevation, from an inside position, of the inverted French F-channel of FIG. 1.
Figure 4:
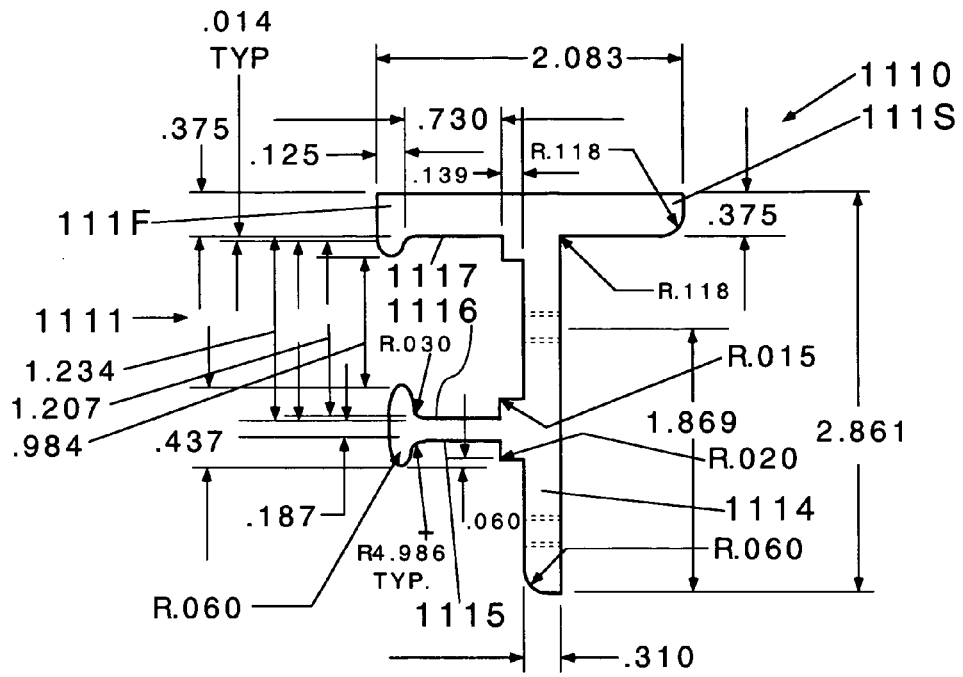
FIG. 4 is a plan view in elevation, from a front or rear (head-on) position, of the inverted French F-channel of FIG. 1.
Figure 5:
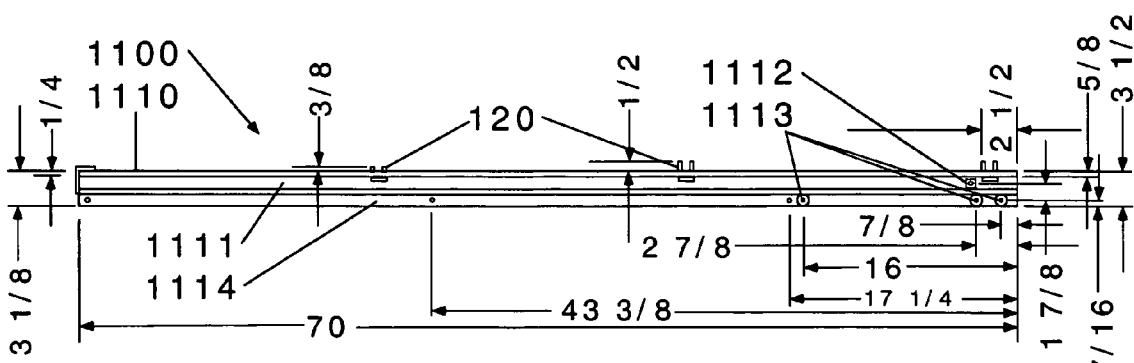
FIG. 5 is a side plan view in elevation, from an inside position, of the inverted French F-channel of FIG. 1, with cam-follower roller bearings installed.
Figure 12:
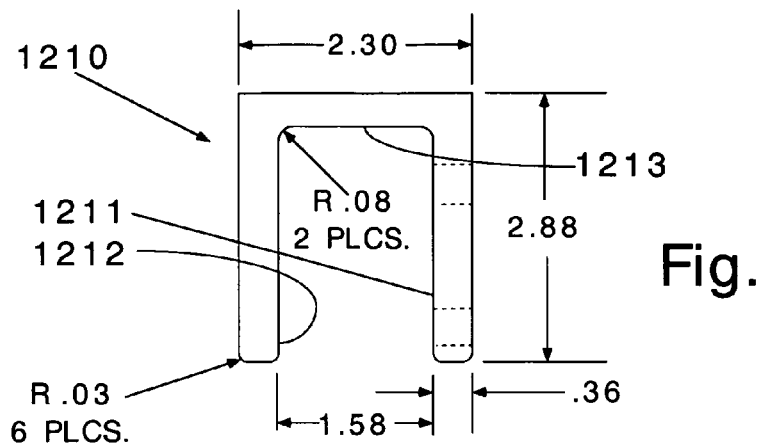
FIG. 12 is a plan view in elevation, from a head-on position, of the inverted U-channel of FIG. 10.
Figure 13:
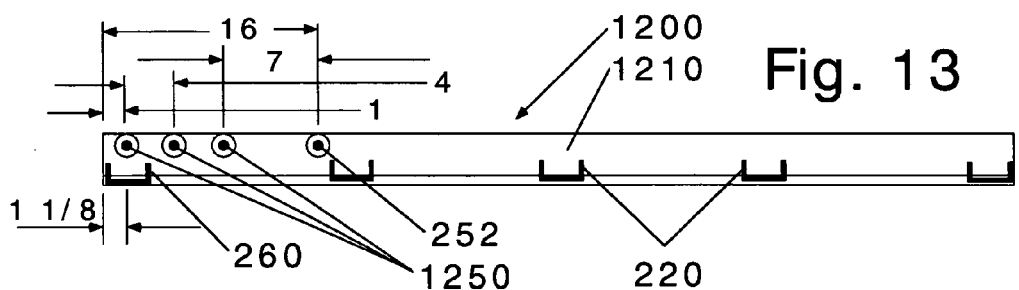
FIG. 13 is a side plan view in elevation, from an inside position, of the inverted U-channel of FIG. 10, with cam-follower roller bearings installed.
Figure 14:
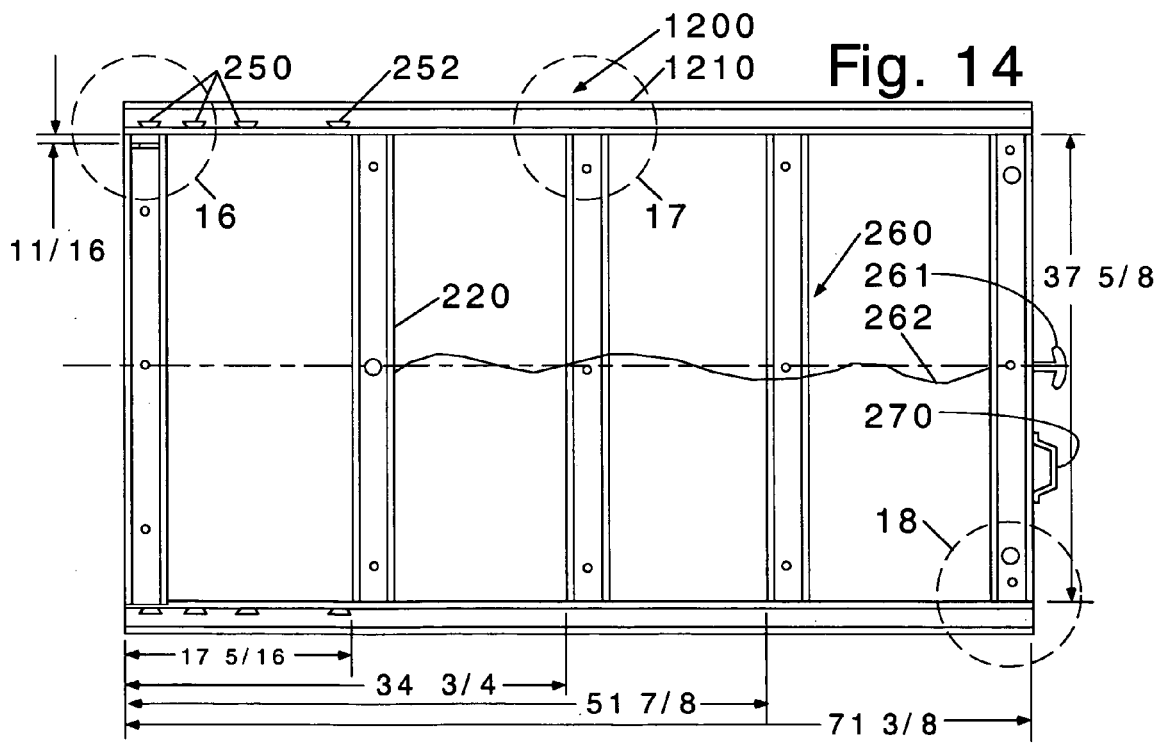
FIG. 14 is a top plan view of a movable mounting frame of the invention, which includes a paired set of parallel inverted U-channels from FIG. 13.
Figure 19:
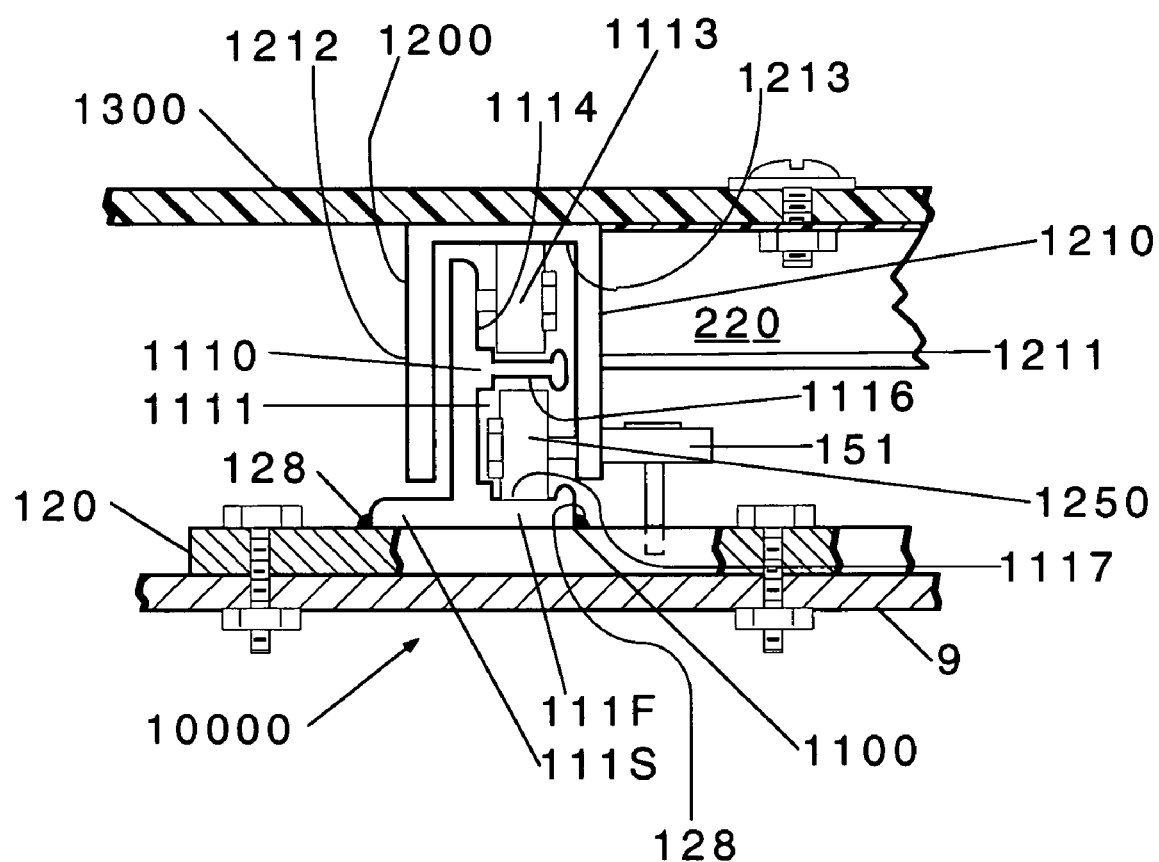
FIG. 19 is a rear view, in partial section, in detail, of a left side of a pull out drawer system of the invention which includes the stationary and movable frames of FIGS. 5 and 13, the assembly mounted to a suitable surface of a vehicle or trailer, but having its rear roller stopping block removed for clarity.
Figure 20:
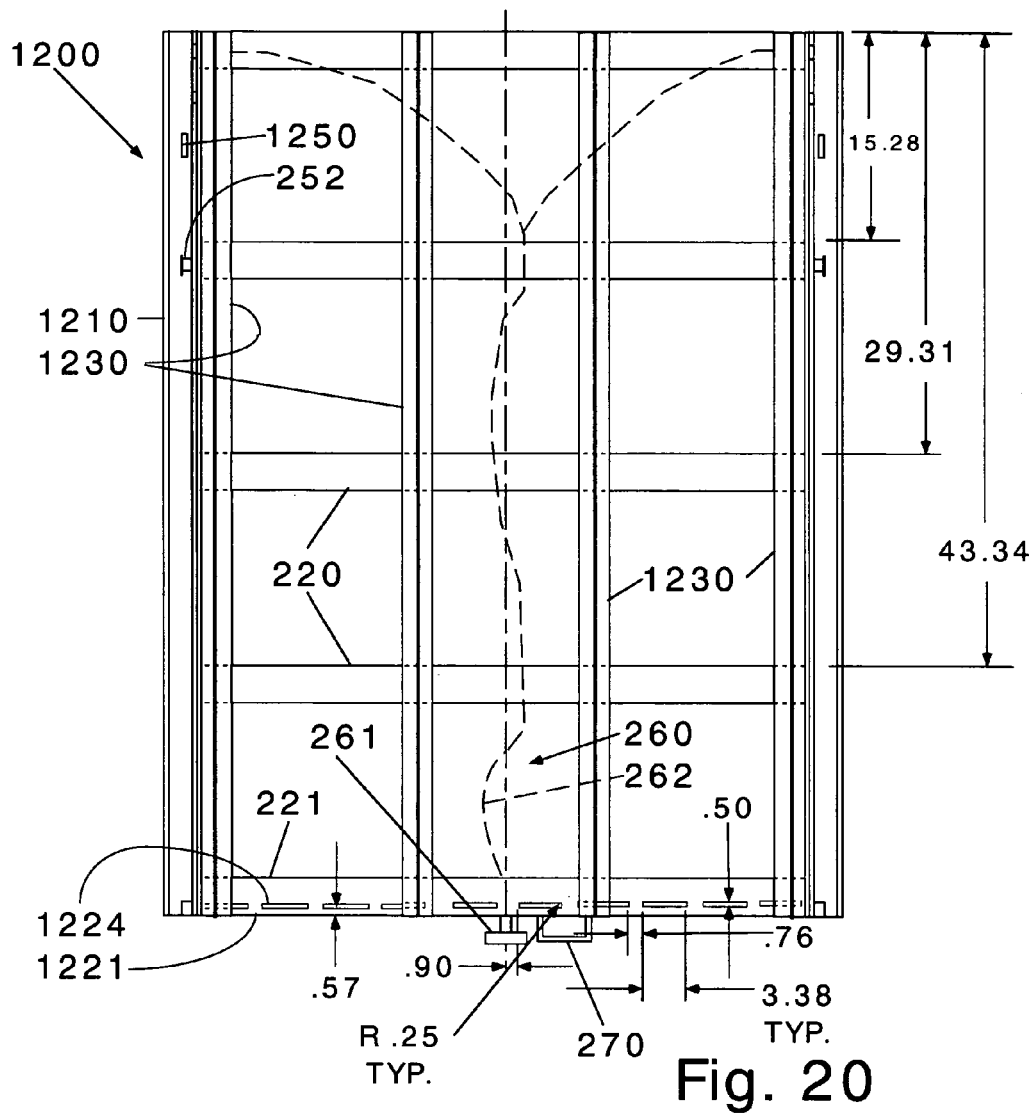
FIG. 20 is a bottom plan view of another embodiment of a movable mounting frame of the invention, based on that of FIG. 14 and further including a support member for supporting a slide-in/out accessory.
Figure 21:
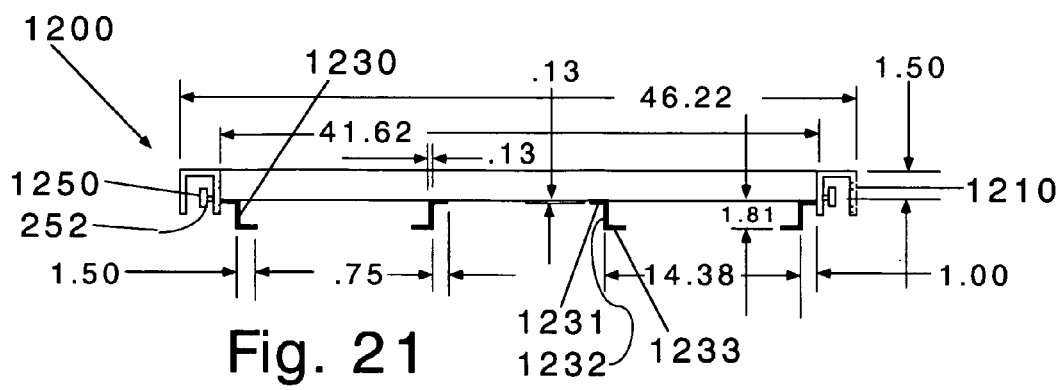
FIG. 21 is a rear view of the movable frame of FIG. 20, with its face plate removed.
Figure 22:
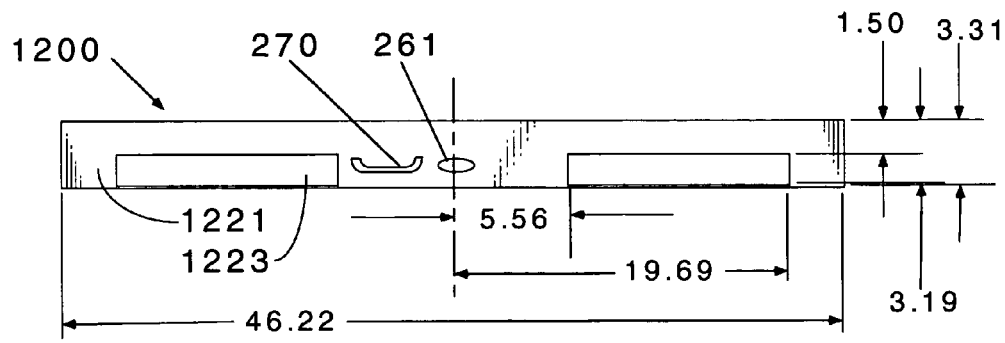
FIG. 22 is a rear view of the movable frame of FIG. 20, including its face plate.
Figure 23:
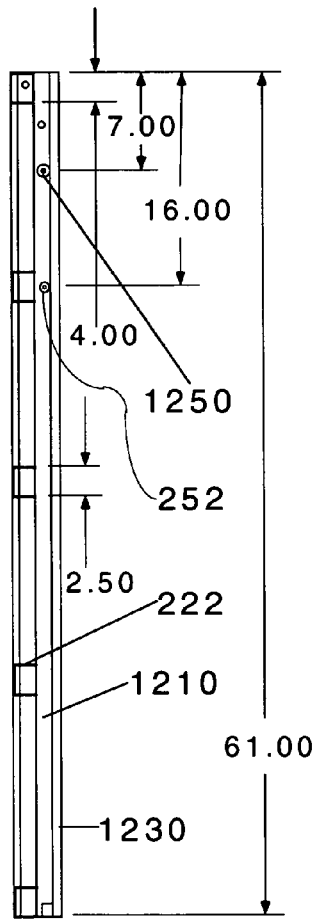
FIG. 23 is a side plan view of the movable frame of FIG. 20.
Figure 24:
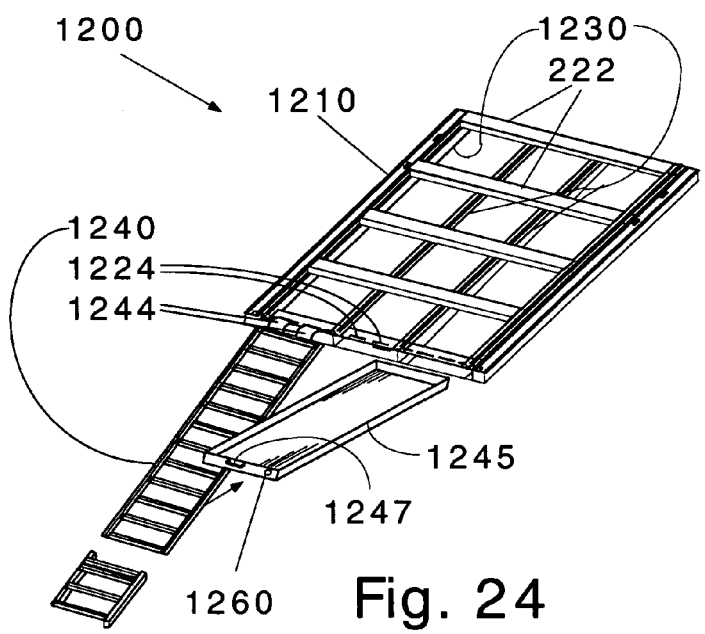
FIG. 24 is a perspective view of the movable frame of FIG. 20 with slide-in/slide out accessories present.

The invention can be further understood by the following detail, which may be read in view of the drawings. Such is to be taken in an illustrative and not necessarily limiting sense.

So as to form a more full and convenient foundation for the present invention, the specifications of the four U.S. patents to Darbishire mentioned previously, U.S. Pat. Nos. 6,328,364; Des.446,181; Des. 452,472; and Des. 458,209, are incorporated herein by reference in their entireties.

With further respect to the present drawings, dimensions, which are listed in inches and which may be considered to be approximate, may be provided, the tolerances of which, again in inches, unless otherwise specified, are as follows:

| Decimals machined | | Sheet metal | Bend dimensions: | ±0.31 |
|---|---|---|---|---|
| X.X | ±0.1 | ±0.03 | Weld dimensions: | ±0.06 |
| X.XX | ±0.01 | Sheet metal, | Angles | |
| X.XXX | ±0.005 | punched hole | XX DEG. ±30 MIN. | |
| X.XXXX | ±0.0005 | ±0.15 | XX DEG. XX MIN. ±5 MIN. | |

Dimensions provided in the present drawings are exemplary, here being particular to a system assembly for a standard short bed pickup truck, and may be varied to suit a particular application.

In general, system 10000 of the present invention can include stationary frame 1100 and movable frame 1200. The system 10000 can include load-bearing surface 1300 such as a tray, flat deck with or without attached and/or modular storage attachment(s) such as a tool box, open or closed top storage box compartment, drawer set, and so forth. The system 10000 is generally akin to, although improved in kind from, the system 1000 of the mentioned utility patent to Darbishire.

The stationary frame 1100 has inverted French F-channel 1110, for example, of extruded aluminum, which has lower rail roller track 1111 bounded about the bottom by channel track foot 111F, and has stabilizing base foot 111S, each of which are thick, being some 1.5–4, say three, times as thick as the lone "foot" on the inverted F-channel of the Darbishire system. Roller stop block 1112 may be provided and mounted in any suitable fashion, say, at the "tailgate" (rear) end of the channel 1110. As the first set of rollers, cam-following bearings 1113, which are generally of the pin or needle bearing type, each, for example, being rated with a 3000-pound capacity, are mounted in thick, vertically extending face 1114, some 25–75%, say, about 50%, thicker than the comparable face 114 of the Darbishire inverted F-channel, which extends from the feet 111F, 111S. Preferably, three rollers 1113 are mounted with each inverted French F-channel 1110, especially about the rear end of the channel 1110. Upper roller track face 1115 is formed on thick central horizontally extending portion, which is some 1.2–1.8, say, about 1.5, times as thick as the comparable portion of the inverted F-channel of the Darbishire system, and which has downward facing roller track face 1116 that forms with upward facing roller track face 1117 and so forth of the track 1111. The roller track faces 1116 and 1117 can accommodate wider drawer frame rollers 1250, which can also be the same model or type of cam-following bearings as the bearings 1113. Locking pin insertion hole 1163 can be provided. Other stationary frame components are akin if not the same as the components and features of the Darbishire system such as cross-members 120, welds 128, inside roller bearing wheels 151 and so forth.

The movable frame 1200 has inverted U-channel 1210, for example, of extruded aluminum, on which is mounted the second set of roller(s) 1250. For example, one or three rollers 1250 may be mounted with each inverted U-channel 1210, and, if three or more, especially generally evenly distributed about the "cap" (front) end of the frame. The channel 1210 can have bearing-mounting portion 1211; depending, rail-aligning portion 1212; and upper, tray or other load-bearing surface mounting and supporting portion 1213. Other movable frame components are akin if not the same as the features and components of the Darbishire system such as cross-members 220, extension stops 252, drawer-locking subsystem 260 with its release handle 261, link 262, pin 263, link split 264, pull out handle 270, and so fourth. In addition, further feature(s) may be provided. For instance, face plate 1221 with face plate opening(s) 1223 may be provided at the rear of the frame 1200. Receiver slot(s) 1224 may be provided about the top of the member 221. These may be employed to advantage with the provision of support member 1230, which may be in the form of a simple hanging pan or a set of parallel rails in any suitable shape such as that of a "C," "Z," and so fourth, for example, the Z-shape having top attachment member 1231, which may be attached in any suitable manner to the frame 1200, say, by welding, and/or by gluing, screwing, riveting and/or bolting to the cross-members 221 and 222; depending member 1232; and undersupport member 1233 for supporting a slide-in/out accessory. As the slide-in/out accessory may be mentioned ramp 1240, which may be employed to push or ride such items as a lawnmower, snowblower, power washer, snowmobile, all-terrain vehicle, motorocycle, and so forth up onto the load-bearing surface 1300, especially as having hook(s) 1244 for insertion into the receiver slot(s) 1224 and/or having other attaching devices such as nuts and bolts, magnets and/or clamps; and/or an internally sliding, cargo-holding bed such as drawer 1245. Handle 1247 and/or lock 1260 may be provided on the slide-in/out accessory as well as can be bearings for smooth performance. As an alternative, the support member 1230 may simply be provided as a slot or pigeon-hole into which items such as a rake, ice pick, supply of dimension lumber may be stowed.

Thus, a 3000-pound load capacity or more is now provided in the pull out system and pull out drawer system as of Darbishire. This represents, in general, a carrying capacity which is two to three times that of the already advanced system of Darbishire. What is more, added versatility in a pull out drawer system is provided, and this by taking efficient advantage of space between the sides of the stationary and movable frames 1100, 1200 and below any top 1300 as well as generally below at least the upper portion, if not the entire structure, of at least one member 221/222. Access to such a system is convenient and efficient.

The present invention is thus provided. Various features, parts, subcombinations and combinations can be employed with or without reference to other features, parts, subcombinations or combinations in the practice of the invention; numerical values can be considered approximate therein; and numerous adaptations and modifications can be effected within its spirit, the literal claim scope of which is particularly pointed out as follows:

We claim:

1. In a pull out system having at least one stationary rail cooperating with at least one movable rail through rollers in which the at least one movable rail can be moved relative the at least one stationary rail, the improvement which comprises:
   as the at least one stationary rail, a first channel that includes a lower rail roller track; a channel track foot that bounds a bottom of the lower rail roller track; an upward facing lower roller track face on the channel track foot; a stabilizing base foot, which extends opposite the channel track foot; a vertically extending face that extends from the channel track and stabilizing base feet; a central portion extending horizontally from the vertically extending face, which has an upper roller track face, and a downward facing roller track face that that forms with the upward facing lower roller track face the lower rail roller track, which can receive at least one roller; wherein first rollers are mounted in the vertically extending face and project in the same direction as and above the central portion.

2. The improvement of claim 1, which system is for vehicles and trailers.

3. The improvement of claim 2, wherein:
   as the at least one movable rail, a second channel is also present, which includes a depending bearing-mounting portion; a depending, rail-aligning portion, which extends downwardly substantially the same distance as does the bearing-mounting portion; and upper, tray or other load-bearing surface mounting and supporting portion, which extends laterally between and connects to the bearing-mounting and rail-aligning portions, and which can be mounted on the first rollers of the first channel with rolling contact between it and the first rollers; wherein at least one second roller is mounted in the bearing-mounting portion and projects toward the rail-aligning portion so as to be receivable in the lower rail roller track of the first channel and provide rolling contact with the lower rail roller track; and the at least one second roller is a plurality of rollers.

4. The improvement of claim 3, which includes a stationary mounting frame having the at least one stationary rail as a set of parallel rails, each of which is the first channel; and a movable mounting frame having the at least one movable rail as a set of parallel movable rails, each of which is the second channel; and a load-bearing surface mounted to the movable frame.

5. The improvement of claim 3, wherein:
   the first rollers mounted in the first channel include a plurality of rollers mounted about a rear end of the first channel;
   the at least one second roller mounted in the second channel includes a plurality of rollers evenly distributed about a front end of the second channel; and
   a plurality of needle type bearings is present.

6. The improvement of claim 4, wherein:
   the first rollers mounted in the first channel include a plurality of rollers mounted about a rear end of the first channel;
   the at least one second roller mounted in the second channel includes a plurality of rollers evenly distributed about a front end of the second channel; and
   a plurality of needle type bearings is present.

7. The improvement of claim 4, wherein the first rollers on each stationary rail, first channel include at least three rollers, and an at least about 3000-pound load can be supported.

8. The improvement of claim 6, wherein the first rollers on each stationary rail, first channel include at least three rollers, and an at least about 3000-pound load can be supported.

9. The improvement of claim 4, wherein the movable mounting frame includes a support member for supporting a slide-in/out accessory that can slide in and slide out relative to the movable mounting frame.

10. The improvement of claim 9, wherein the slide-in/out accessory is present.

11. The improvement of claim 10, wherein the slide-in/out accessory is a drawer.

12. The improvement of claim 10, wherein the slide-in/out accessory is a ramp.

13. A channel comprising a lower rail roller track; a channel track foot bounding a bottom of the lower rail roller track; an upward facing lower roller track face on the channel track foot; a stabilizing base foot extending opposite the channel track foot; a vertically extending face extending from the channel track and stabilizing base feet; a central portion extending horizontally from the vertically extending face, which has an upper roller track face; and a downward facing roller track face that forms with the upward facing lower roller track face the lower rail roller track, which can receive at least one roller; wherein a set of rollers other than said at least one roller is mounted in the vertically extending face and projects in the same direction as and above the central portion.

14. The channel of claim 13, wherein the set of rollers other than said at least one roller includes at least three rollers of which a plurality are mounted about one end of the channel.

15. The channel of claim 14, wherein the at least three rollers are needle type bearings.

16. In a movable mounting frame for a pull out drawer system having a stationary frame and the movable mounting frame, which can move in relation to the stationary frame, the movable mounting frame having two outside rails and at least one cross-member between the two outside rails, at least one of the two outside rails and cross-member having a top surface on which a load-bearing surface can be mounted, the improvement which comprises a support member for supporting a slide-in/out accessory between the two outside rails and below said top surface of the movable mounting frame, which can slide in and slide out relative to the movable mounting frame between the two outside rails and below said top surface of the movable mounting frame, wherein the slide-in/out accessory is present, is between the two outside rails and below said top surface of the movable mounting frame, and is selected from the group consisting of a drawer, and a ramp that can be separated from yet attachable to the movable frame; and wherein the movable mounting frame is for a cargo area of a vehicle or trailer, and is connected to the stationary frame as part of the pull out drawer system.

17. The improvement of claim 16, wherein the slide-in/out accessory is the drawer.

18. The improvement of claim 16, wherein the slide-in/out accessory is the ramp.

19. The improvement of claim 16, wherein the slide-in/slide-out accessory includes both the drawer and the ramp, and at least one of the drawer and the ramp has a length substantially greater than its width and slides in and slides out in a direction of its length.

20. The improvement of claim 16, which further includes a load-bearing surface mounted on top of the movable frame so that the load-bearing surface remains fixed in relation to the movable frame.

* * * * *